United States Patent
Hanatani et al.

(10) Patent No.: US 10,355,855 B2
(45) Date of Patent: Jul. 16, 2019

(54) COMMUNICATION CONTROL DEVICE, COMMUNICATION DEVICE, AND COMPUTER PROGRAM PRODUCT

(71) Applicant: KABUSHIKI KAISHA TOSHIBA, Minato-ku (JP)

(72) Inventors: Yoshikazu Hanatani, Kawasaki (JP); Toru Kambayashi, Chigasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 376 days.

(21) Appl. No.: 15/259,839

(22) Filed: Sep. 8, 2016

(65) Prior Publication Data

US 2016/0380764 A1    Dec. 29, 2016

Related U.S. Application Data

(63) Continuation of application No. PCT/JP2014/056999, filed on Mar. 14, 2014.

(51) Int. Cl.
  *H04L 9/08* (2006.01)
  *H04L 29/06* (2006.01)

(52) U.S. Cl.
  CPC .......... *H04L 9/0833* (2013.01); *H04L 63/065* (2013.01); *H04L 2209/24* (2013.01)

(58) Field of Classification Search
  CPC .................................................. H04L 9/0833
  USPC ......................................................... 380/279
  See application file for complete search history.

(56) References Cited

U.S. PATENT DOCUMENTS

| | | | |
|---|---|---|---|
| 2005/0213765 A1 | 9/2005 | Mihaljevic et al. | |
| 2006/0062394 A1 | 3/2006 | Kamijo | |
| 2009/0028330 A1 | 1/2009 | Kamijo | |
| 2010/0080385 A1 | 4/2010 | Kamijo | |
| 2012/0250867 A1 | 10/2012 | Kambayashi et al. | |
| 2013/0022196 A1 | 1/2013 | Kambayashi et al. | |
| 2013/0259227 A1 | 10/2013 | Hanatani et al. | |

(Continued)

FOREIGN PATENT DOCUMENTS

| | | |
|---|---|---|
| JP | 2004-349733 A | 12/2004 |
| JP | 2006-13790 A | 1/2006 |

(Continued)

OTHER PUBLICATIONS

International Search Report and Written Opinion dated Apr. 8, 2014 in PCT/JP2014/056999 (submitting English translation only).

(Continued)

*Primary Examiner* — Kambiz Zand
*Assistant Examiner* — Thanh H Le
(74) *Attorney, Agent, or Firm* — Oblon, McClelland, Maier & Neustadt, L.L.P.

(57) ABSTRACT

According to an embodiment, a communication control device includes a generating unit and a sending unit. The generating unit refers to specification information, which specifies the communication device belonging to a group from among a plurality of communication devices, and generates identification information, which enables identification of the communication device specified in the specification information, by implementing, from among a plurality of generation methods for generating the identification information, a generation method in which the size of the generated identification information is smaller than the other generation methods. The sending unit sends the identification information to a plurality of communication devices.

11 Claims, 11 Drawing Sheets

(56) References Cited

U.S. PATENT DOCUMENTS

2015/0086010 A1    3/2015   Kambayashi et al.
2015/0215119 A1    7/2015   Kambayashi et al.

FOREIGN PATENT DOCUMENTS

| | | |
|---|---|---|
| JP | 2012-213009 A | 11/2012 |
| JP | 2013-26747 A | 2/2013 |
| JP | 2013-207376 A | 10/2013 |

OTHER PUBLICATIONS

Yoshikazu Hanatani, et al., "Group Key Management Technology for Machine-to-Machine Communication Systems", Toshiba Review, vol. 69, No. 1, 2014, pp. 14-17 (with English Abstract).
Seiji Okuaki, et al., "Complete Subtree Method to Subset Difference Method o Yugo Shita Hybrid System no Teian", The 2003 Symposium on Cryptography and Information Security, 2003, 6 Pages.
Yoshikazu Hanatani, et al., "Detailed Proposal to IEEE 802.21d based on MKB for TGd", Retrieved from Internet: <https://mentor.ieee.org/802.21/documents>, 2013, pp. 1-14.

COMMUNICATION CONTROL DEVICE, COMMUNICATION DEVICE, AND COMPUTER PROGRAM PRODUCT

CROSS-REFERENCE TO RELATED APPLICATIONS

This application is a continuation of PCT international application Ser. No. PCT/JP2014/056999 filed on Mar. 14, 2014, the entire contents of which are incorporated herein by reference.

FIELD

Embodiments described herein relate generally to a communication control device, a communication device, and a computer program product.

BACKGROUND

A technology for managing group members has been proposed in which a common group key is provided only to the members belonging to a group. Moreover, in order to distribute a common group key to group members in a safe manner, a technology for managing group members has been proposed in which only the members belonging to a group use a group key block (GKB) enabling retrieval of the common group key. Various methods such as the Complete Subtree method and the Subset Difference method are known as the methods for creating a GKB.

A plurality of GKB creation methods is available. However, in the conventional technology, it is possible to implement only a single predetermined method, thereby resulting in a lack of flexibility.

DETAILED DESCRIPTION

Figure 1:
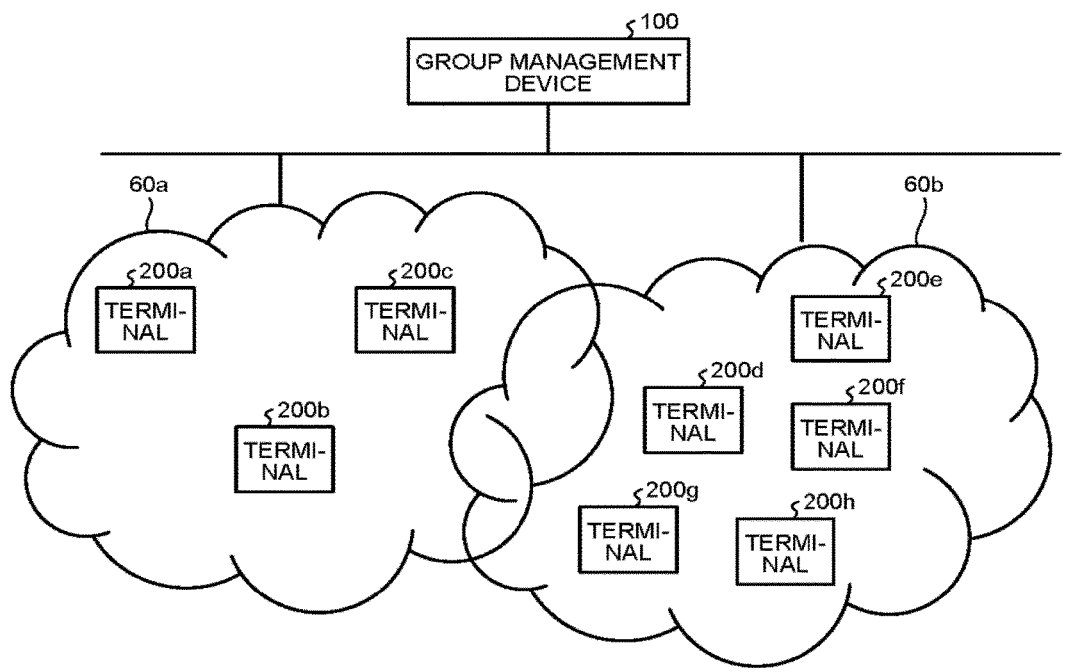
FIG. 1 is a block diagram of a communication system according to embodiments.

According to an embodiment, a communication control device includes a generating unit and a sending unit. The generating unit refers to specification information, which specifies the communication device belonging to a group from among a plurality of communication devices, and generates identification information, which enables identification of the communication device specified in the specification information, by implementing, from among a plurality of generation methods for generating the identification information, a generation method in which the size of the generated identification information is smaller than the other generation methods. The sending unit sends the identification information to a plurality of communication devices.

Preferred embodiments of a communication control device according to the present invention are described below in detail with reference to the accompanying drawings.

In the communication control device according to the embodiments described below, the method for generating identification information, which enables identification of group members (i.e., communication devices belonging to a group), is varied according to the configuration of the group members. As a result, the data (identification information) that represents the group members is reduced in size than in the past. Moreover, as a result of issuing operation commands using such data, it becomes possible to perform group management in a more efficient manner than in the past.

(First Embodiment)

A technology for specifying the group members belonging to a group is known in which the CS (Complete Subtree) method using a predetermined tree structure (a binary partition tree structure) is implemented. According to this technology, the size of the data representing the group members can be reduced. However, depending on the configuration of the group members, reduction in the size of the data may not be achieved to a satisfactory extent.

In that regard, in a communication system according to a first embodiment, a group management device (an example of a communication control device) implements a plurality of generation methods using a single particular tree structure as the methods for generating identification information that enables identification of terminals (an example of communication devices) serving as group members. More particularly, a method for generating identification information in which the terminals belonging to the group are specified according to the CS method is separately implemented from a method for generating identification information in which the terminals not belonging to the group are specified according to the CS method. As a result, it becomes possible to hold down the data size to a greater extent than in the case of implementing only the method for specifying the terminals belonging to the group according to the CS method. Meanwhile, a group management device is called a command center when it issues a group operation command. Moreover, a group member is sometimes also called a reception device.

In the commonplace CS method, devices are managed using a management tree that represents a complete binary tree in which each node is assigned with a node index, which enables identification of the node, and with a node key. Each leaf node of the management tree is associated to a different communication device. Meanwhile, identification information represents information in which, from among device identification information of a plurality of communication devices associated to the leaf nodes of the management tree, the specified device management information is expressed according to the CS method. According to the structure of the management tree, each terminal is assigned with a device key representing the set of the node index and the node key.

A group management device holds all device keys and, depending on the configuration of the group members, selects node keys according to the procedure defined in the CS method. Then, the group management device encrypts the group key using the selected node keys to generate cipher texts and distributes encryption data, which represents the set of cipher texts, and an encryption data index that specifies the node keys to be used in decoding. As a result, the group key can be safely sent only to arbitrary terminals. Each terminal that receives the encryption data index and the encryption data verifies whether or not one of the node keys specified in the encryption data index is included in the device key held in the concerned terminal. If the node key is included, the terminal processes the encryption data using that node key, and derives the group key.

In contrast, in the first embodiment, the device key is not used, and the group key is not distributed to the group members. The information equivalent to the encryption data index in the CS method is used as the identification information for identifying the group members. That is, the identification information is generated and processed using the method of generating the encryption data index and the method of processing the encryption data index.

In the communication system according to the first embodiment, each terminal stores in advance leaf identification information (the node index of the corresponding leaf node) indicating one of the leaves of the tree structure. Based on the leaf identification information, each terminal is assumedly able to derive the node index of each node in the path starting from the root of the tree structure to the leaf identified by the leaf identification information. Alternatively, each terminal can be configured to simply store the node index of each node from the root to the corresponding leaf.

In this way, in the first embodiment, the data size of commands can be reduced without causing an increase in the information needed to be held by each terminal in comparison with the conventional method.

FIG. 1 is a block diagram illustrating an exemplary configuration of the communication system according to the embodiments. As illustrated in FIG. 1, in the communication system according to the embodiments, terminals 200a to 200h functioning as communication devices are connected to a group management device 100, which functions as a communication control device, via a network 60a or a network 60b.

As far as the networks 60a and 60b are concerned, it is possible to use any network form such as the Internet. However, the network form is not limited to the example illustrated in FIG. 1. Moreover, each device can be connected to a single network or can be connected to three or more networks. Furthermore, the terminals 200a to 200h need not be directly connected to the group management device 100.

Moreover, the group management device 100 need not be a single device, and it is possible to have two or more group management devices. Since the terminals 200a to 200h have an identical configuration, they are sometimes simply referred to as terminals 200 in the following explanation. Moreover, the number of terminals 200 is not limited to eight.

In the first embodiment, the group management device 100 issues a group operation command to the terminals 200. For example, a group operation command includes group identification information (Group Identifier, GID) enabling identification of the target group for operations and includes identification information.

Figure 2:
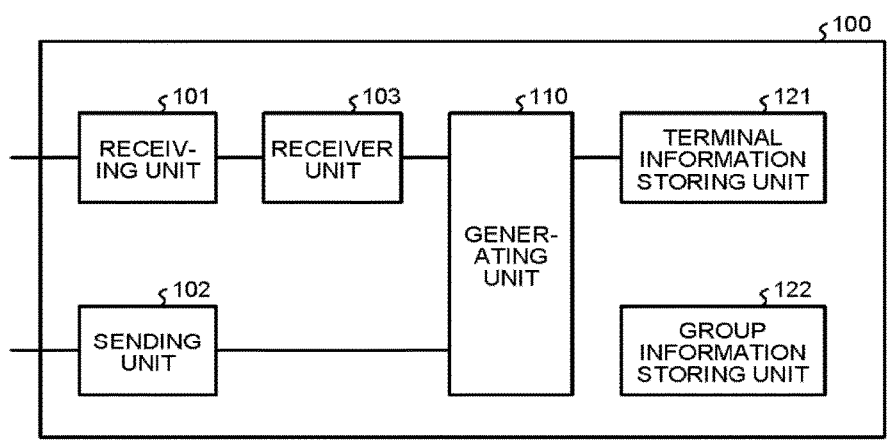
FIG. 2 is a block diagram of a group management device.

FIG. 2 is a block diagram illustrating an exemplary configuration of the group management device 100. As illustrated in FIG. 2, the group management device 100 includes a terminal information storing unit 121, a group information storing unit 122, a receiving unit 101, a sending unit 102, a receiver unit 103, and a generating unit 110.

The terminal information storing unit 121 is used to store information (terminal management information) used in managing the target terminals 200 for management. In the terminal information storing unit 121, the terminals 200 are managed according to the CS method. That is, each target terminal 200 for management is managed (stored) in a corresponding manner to a leaf of a binary tree. Herein, it is assumed that each terminal 200 knows in advance the corresponding leaf of the binary tree. The terminal management information stored in the terminal information storing unit 121 represents, for example, information about the binary tree and about the correspondence relationship between the terminals 200 and the leaves of the binary tree.

Figure 3:
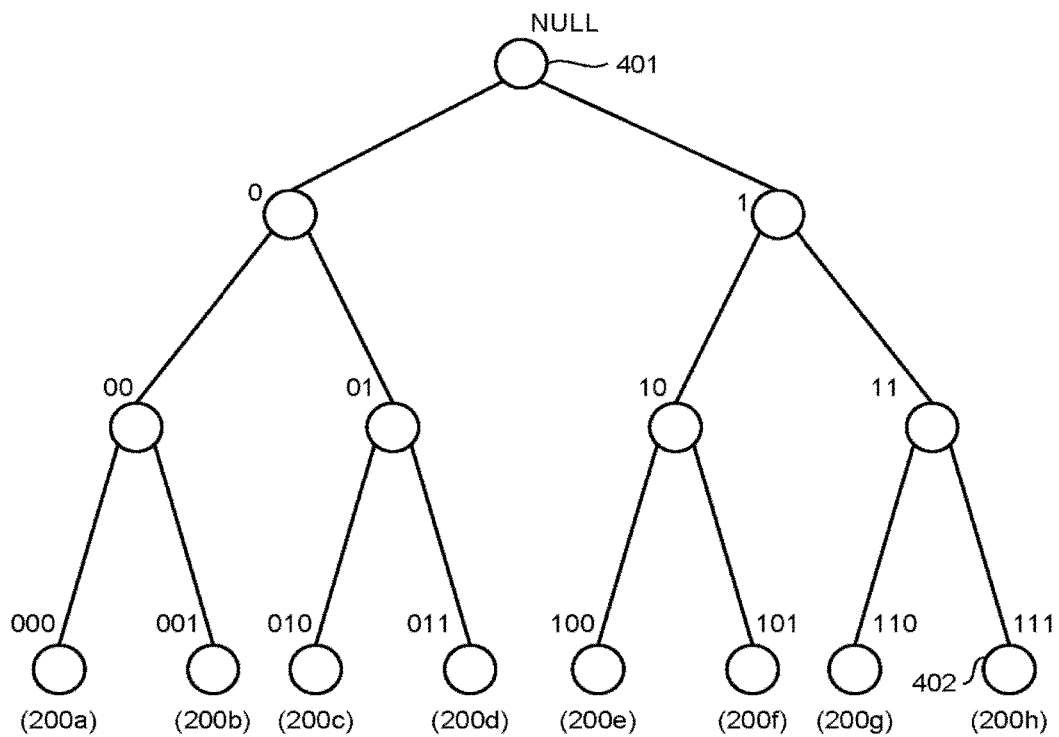
FIG. 3 is a diagram illustrating an example of terminal management information.

FIG. 3 is a diagram illustrating an example of the terminal management information. In FIG. 3, an example illustrated in which eight terminals 200 (the terminals 200a to 200h) are managed using a binary tree having eight leaves. In each node, a node index (Null or a numerical value) is assigned. For example, "Null" is assigned to a root node 401. In the path starting from the root node to each leaf node, the node indexes are formed by adding "0" in the case of moving to the left side or adding "1" in the case of moving to the right side. For example, a node index "111" is assigned to a leaf node 402 at the rightmost position.

Each terminal 200 is associated to one of the eight leaf nodes. Moreover, each terminal 200 is assigned with a set of node indexes of the nodes from the root node to the corresponding leaf node. For example, to the terminal 200 corresponding to a leaf node 402, a node index set "Null, 1, 11, 111" is assigned.

Returning to the explanation with reference to FIG. 2, the group information storing unit 122 is used to store, for example, group information containing group identification information of a group to which one or more terminals 200 belong and containing device identification information (terminal IDs) that enables identification of the terminals 200 belonging to the group identified by the group identification information. For example, the leaf identification information mentioned above can be used as the device identification information.

The receiving unit 101 receives a variety of information from external devices such as the terminals 200. For example, the receiving unit 101 receives group identification information enabling identification of the target group for operations and includes a group member list. The group member list represents a list of device identification information of the terminals 200 belonging to the concerned group.

The sending unit 102 sends a variety of information to external devices such as the terminals 200. For example, the sending unit 102 sends, to the target terminals 200 for group operations, a group operation command that at least includes identification information; method identification information enabling identification of the method implemented for generating the identification information; and group identification information.

The receiver unit 103 receives specification information that specifies the terminals 200 belonging to the group. For example, the receiver unit 103 receives the group member list, which is received by the receiving unit 101, as the specification information of the terminals 200 belonging to the group. However, that is not the only possible method for receiving the specification. Alternatively, for example, the receiver unit 103 can receive a group member list that is decided by the group management device 100 by taking into account the status of the communication system.

The generating unit 110 selects a single generation method from among a plurality of generation methods for generating identification information that would enable identification of the specified group member, and generates identification information according to the selected generation method. For example, the generation unit 110 selects such a generation method in which the generated identification information is smaller in size (volume) as compared to other generation methods. That enables achieving reduction in the size of the identification information and avoiding an increase in the communication load.

For example, by referring to the group identification information of the group specified for group operations, by referring to the group member list, and by referring to the terminal management information; the generating unit 110 selects a single generation method according to the number of terminals 200 (the number of members) included in the group member list. The generating unit 110 generates identification information according to the selected generation method, and outputs the generated identification information along with the method identification information regarding the selected generation method. Meanwhile, if the generation method is identifiable from the format of the identification information, then the method identification information may be omitted.

Figure 4:
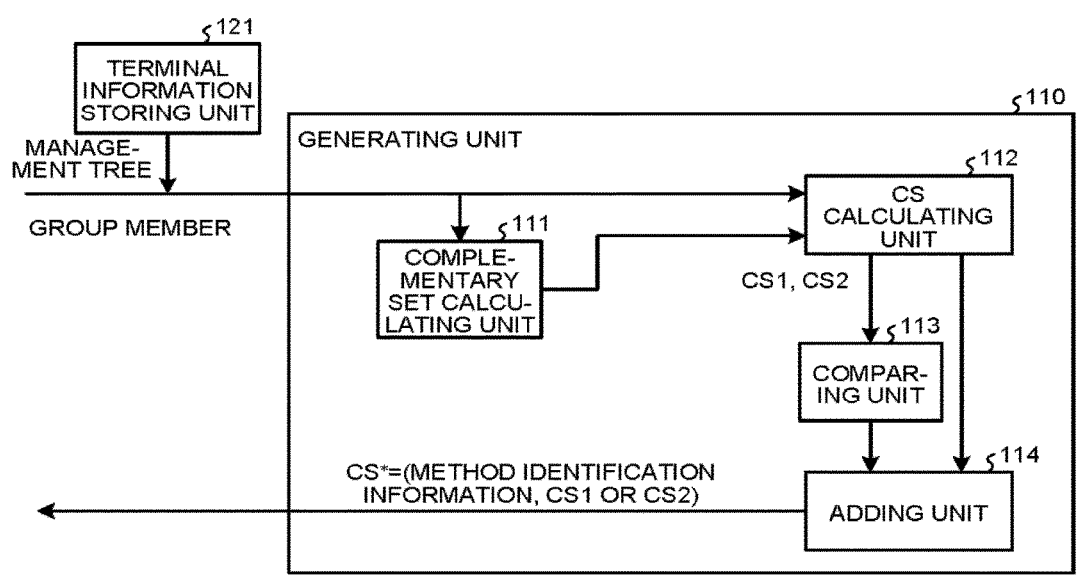
FIG. 4 is a block diagram of a generating unit according to a first embodiment.

FIG. 4 is a block diagram illustrating an exemplary detailed configuration of the generating unit 110. As illustrated in FIG. 4, the generating unit 110 includes a complementary set calculating unit 111, a CS calculating unit 112, a comparing unit 113, and an adding unit 114.

The complementary set calculating unit 111 receives the group member list and calculates a group member complementary set list. Herein, the group member complementary set list implies the list formed by excluding, from the list of all terminals 200 managed in the binary tree (management tree), the terminals 200 that are included in the group member list. For example, assume that the terminals 200 are managed in a binary tree as illustrated in FIG. 3 and, from among the eight terminals 200 (200a to 200h), the device identification information of the terminals 200a to 200d is included in the group member list. In that case, the complementary set calculating unit 111 calculates a group member complementary set list that includes the device identification information of the terminals 200e to 200h.

The CS calculating unit 112 calculates first-type identification information (CS1) from the group member list and the terminal management information, and calculates second-type identification information (CS2) from the group member complementary set list and the terminal management information. In this way, in the first embodiment, as a plurality of generation methods, a first method is implemented in which first-type identification information is generated by compressing the specified device identification information (the group member list) according to the CS method, and a second method is implemented in which second-type identification information is generated by compressing the unspecified device identification information (the group member complementary set list) according to the CS method.

For example, assume that the terminal management information as illustrated in FIG. 3 is stored, and the device identification information of the terminals 200a to 200d is included in the group member list. In that case, the CS calculating unit 112 implements the CS method and generates "0" as the first-type identification information enabling identification of the terminals 200a to 200d. That is because the terminals 200a to 200d are assigned to the nodes present at the lower level of the node having the node index "0". Moreover, the CS calculating unit 112 implements the CS method and generates "1" as the second-type identification information from the device identification information of the terminals 200e to 200h included in the group member complementary set list.

In an identical manner, for example, if the device identification information of the terminals 200a, 200c, 200e, 200g, and 200h is included in the group member list, then the CS calculating unit 112 generates "000, 010, 100, 11" as the first-type identification information. Moreover, the CS calculating unit 112 refers to the device identification information of the terminals 200b, 200d, and 200f included in the group member complementary set list in this case, and generates "001, 011, 101" as the second-type identification information according to the CS method.

The comparing unit 113 compares the size of the first-type identification information with the size of the second-type identification information, and outputs the comparison result. For example, the comparing unit 113 outputs the identification information having the smaller data size as the comparison result. However, the information output as the comparison result is not limited to the identification information. That is, as long as the output information indicates the comparison result of the sizes of two sets of identification information, it serves the purpose. For example, "0" can be returned when the first-type identification information is smaller, and "1" can be returned when the second-type identification information is smaller.

The adding unit 114 selects one of the sets of identification information (the first-type identification information (CS1) or the second-type identification information (CS2)) based on the comparison result output by the comparing unit 113. Then, the adding unit 114 generates information (CS*) in which method identification information (Flag) of the generation method corresponding to the selected identification information is added to the selected identification information. As long as the method identification information represents information that is agreed upon in advance among the group management device 100 and the terminals 200 managed by the group management device 100, any type of information can be used. For example, method identification information "0" represents the generation method for generating first-type identification information (a first method), and method identification information "1" represents the generation method for generating second-type identification information (a second method).

Figure 5:
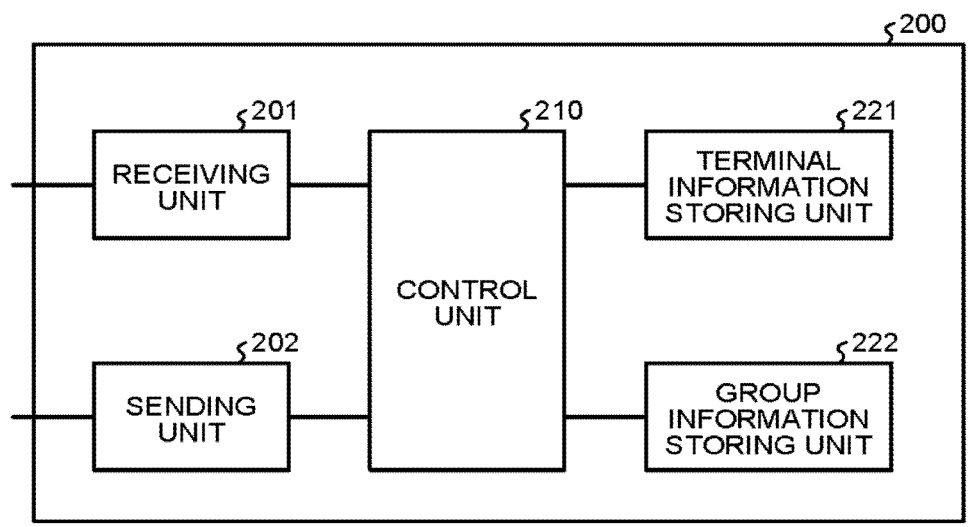
FIG. 5 is a block diagram of a terminal.

Given below is the explanation of an exemplary configuration of the terminal 200. FIG. 5 is a block diagram illustrating an exemplary configuration of the terminal 200. As illustrated in FIG. 5, the terminal 200 includes a terminal information storing unit 221, a group information storing unit 222, a receiving unit 201, a control unit 210, and a sending unit 202.

The terminal information storing unit 221 is used to store terminal-specific information used in processing group operation commands. For example, the terminal information storing unit 221 is used to store a binary tree, which is used in managing the terminals 200, and information enabling identification of the leaf that corresponds the concerned terminal 200 from among the leaves of the binary tree. As far as the concerned leaf of the binary tree is concerned, it is possible to use the node index assigned to the corresponding leaf node. The node index assigned to the corresponding leaf node (i.e., the leaf identification information) can be used as the device identification information (the terminal ID) of the terminal 200 as described above.

The group information storing unit 222 is used to store the group identification information of the group to which at least the concerned terminal 200 belongs.

The receiving unit 201 receives a variety of information from external devices such as the group management device 100. For example, the receiving unit 201 receives a group operation command that at least includes the group identification information of the target group for operations; the method identification information; and the identification information.

The control unit 210 refers to the terminal-specific information stored in the terminal information storing unit 221, and processes the received group operation command. For example, the control unit 210 determines whether or not the concerned terminal 200 should belong to the group specified in the group identification information that is included in the group operation command. Then, the control unit 210 varies the contents of the group information storing unit 222 based on the processing result as may be necessary.

The sending unit 202 sends a variety of information to external devices such as the group management device 100.

Figure 6:
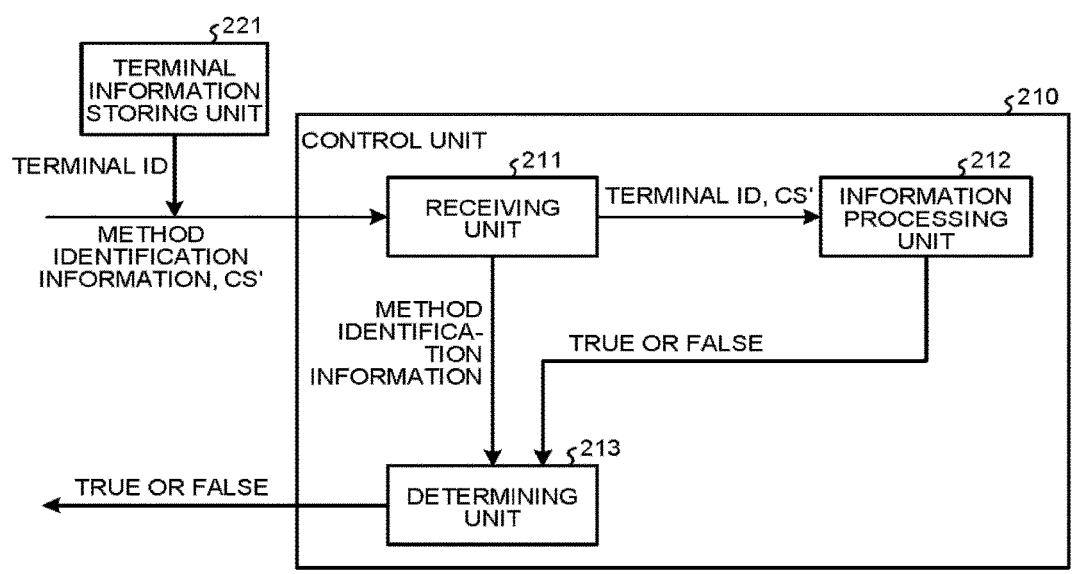
FIG. 6 is a block diagram of a control unit.

FIG. 6 is a block diagram illustrating an exemplary detailed configuration of the control unit 210. As illustrated in FIG. 6, the control unit 210 includes a receiver unit 211, an information processing unit 212, and a determining unit 213.

The receiver unit 211 receives input of the method identification information (Flag), the identification information (CS'), and a terminal ID. The method identification information and the identification information can be obtained, for example, from the group operation command received by the receiving unit 201. The terminal ID can be obtained, for example, from the terminal information storing unit 221. The receiver unit 211 outputs the method identification information to the determining unit 213, and outputs the identification information and the terminal ID to the information processing unit 212.

The information processing unit 212 outputs, to the group members identified by the identification information, output information indicating whether or not the terminal ID of the concerned terminal 200 is included. For example, if the identification information is "000, 010, 100, 11" and if the terminal ID is "110" (corresponding to the terminal 200g), then the information processing unit 212 determines that the terminal ID "110" of the concerned terminal 200 is included as a group member. That is because the leaf node having the node index "110" is included as a node at the lower level of the node having the node index "11".

Herein, the output information can have an arbitrary format. For example, when the terminal ID is included as a group member, the output information can indicate "True". However, when the terminal ID is not included, the output information can indicate "False".

The determining unit 213 determines whether or not the concerned terminal 200 belongs to the group based on the output information output by the information processing unit 212 and based on the method identification information. For example, if the method identification information indicates the first method and if the output information of the information processing unit 212 indicates that the terminal ID is included, then the determining unit 213 determines that the concerned terminal 200 participates in (belongs to) the group. Alternatively, if the method identification information indicates the first method and if the output information of the information processing unit 212 indicates that the terminal ID is not included, then the determining unit 213 determines that the concerned terminal 200 does not participate in the group or has withdrawn from the group. Still alternatively, if the method identification information indicates the second method and if the output information of the information processing unit 212 indicates that the terminal ID is included, then the determining unit 213 determines that the concerned terminal 200 does not participate in the group or has withdrawn from the group. Still alternatively, if the method identification information indicates the second method and if the output information of the information processing unit 212 indicates that the terminal ID is not included, then the determining unit 213 determines that the concerned terminal 200 participates in (belongs to) the group.

Based on the determination result, the determining unit 213 updates the information stored in the group information storing unit 222 as may be necessary. For example, when the concerned terminal 200 is determined to participate in a new group, the determining unit 213 stores the group identification information of the new group in the group information storing unit 222.

Meanwhile, for example, the receiving unit 101, the sending unit 102, the receiver unit 103, the generating unit 110, the receiving unit 201, the control unit 210, and the sending unit 202 can be implemented by making a processor such as a CPU (Central Processing Unit) to execute programs, that is, can be implemented using software; or can be implemented using hardware such as an IC (Integrated Circuit); or can be implemented using a combination of software and hardware.

Moreover, each storing unit mentioned above (i.e., each of the terminal information storing unit 121, the group information storing unit 122, the terminal information storing unit 221, and the group information storing unit 222) can be configured using any commonly used memory medium such as an HDD (Hard Disk Drive), an optical disk, a memory card, or a RAM (Random Access Memory).

Figure 7:
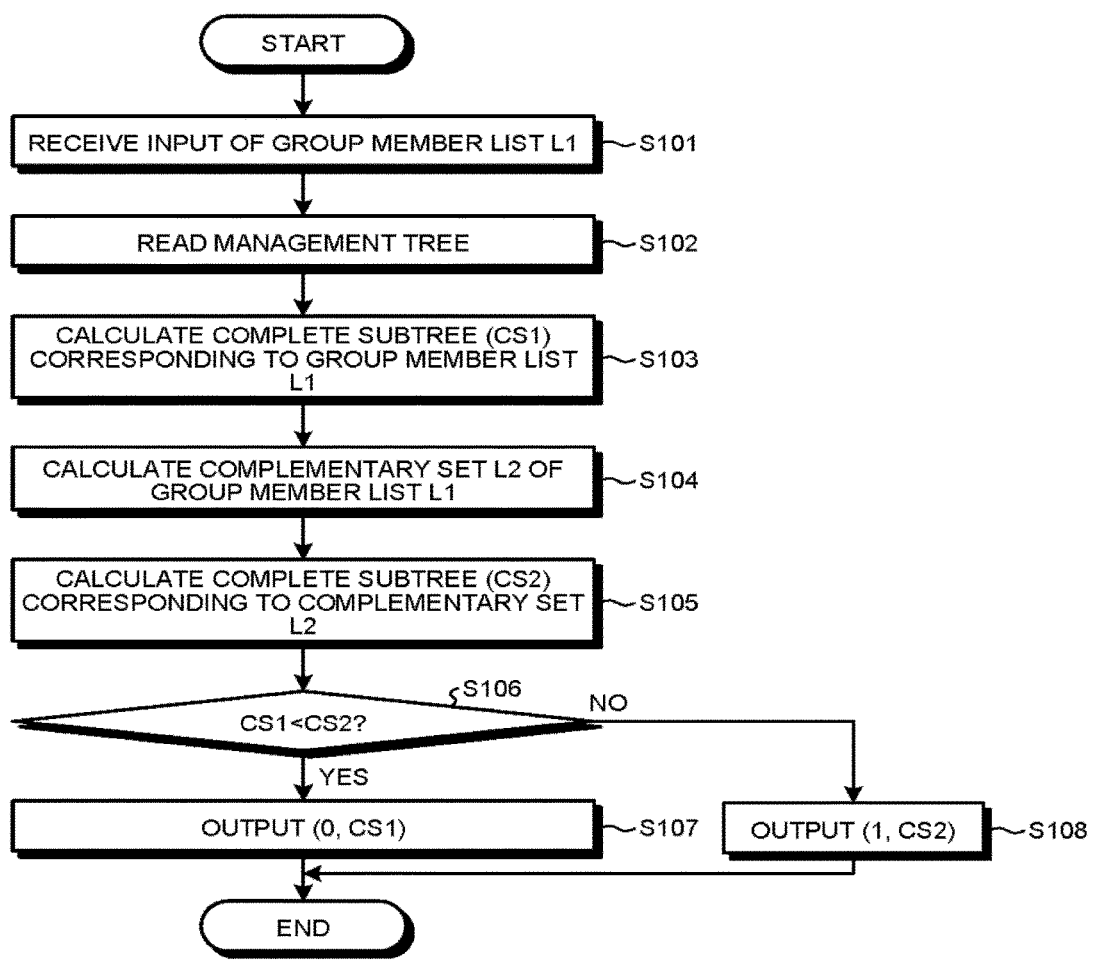
FIG. 7 is a flowchart for explaining a generation operation performed according to the first embodiment.

Explained below with reference to FIG. 7 is a generation operation performed by the group management device 100 configured in the abovementioned manner according to the first embodiment. FIG. 7 is a flowchart for explaining an overall flow of operations during the generation operation performed according to the first embodiment.

The receiver unit 103 receives input of a group member list L1 (Step S101). The generating unit 110 reads a management tree from the terminal information storing unit 121 (Step S102). The CS calculating unit 112 calculates CS1 representing the CS (Complete Subtree) corresponding to the group member list L1 (Step S103).

The complementary set calculating unit 111 calculates a group member complementary set list L2 that represents the list of the complementary set of the group member list L1 (Step S104). The CS calculating unit 112 calculates CS2 representing the CS (Complete Subtree) corresponding to the group member complementary set list L2 (Step S105).

The comparing unit 113 compares whether or not the size of the complete subtree CS1 is smaller than the size of the complete subtree CS2 (Step S106). If the size of the complete subtree CS1 is smaller than the size of the complete subtree CS2 (Yes at Step S106), then the adding unit 114 generates and outputs information (0, CS1) in which the method identification information (for example, "0") corresponding to the complete subtree CS1 is added to the complete subtree CS1 (Step S107). On the other hand, if the size of the complete subtree CS1 is not smaller than the size of the complete subtree CS2 (No at Step S106), then the adding unit 114 generates and outputs information (1, CS2) in which the method identification information (for example, "1") corresponding to the complete subtree CS2 is added to the complete subtree CS2 (Step S108).

Then, for example, the sending unit 102 sends, to the target terminals 200 for group operations, a group operation command that includes the information output by the adding unit 114 and the group identification information. According to the group operation command, each terminal 200 either participates in the group or withdraws from the group.

Figure 8:
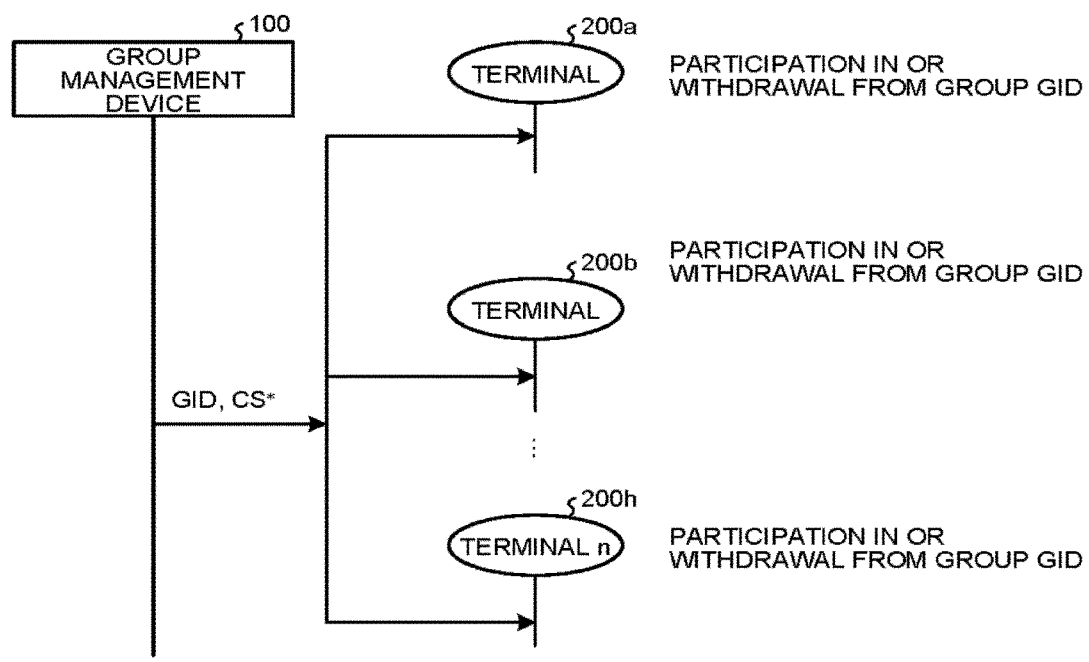
FIG. 8 is a diagram for explaining group operation processing.

FIG. 8 is a diagram for explaining an example of group operation processing. The group management device 100 sends, to the target terminals 200 for group operations, a group operation command that includes information (CS*) generated, for example, according to the generation operation illustrated in FIG. 7 and the group identification information (GID). According to the group operation command, each terminal 200 determines whether to participate in or to withdraw from (not participate in) the group identified by the group identification information GID.

Figure 9:
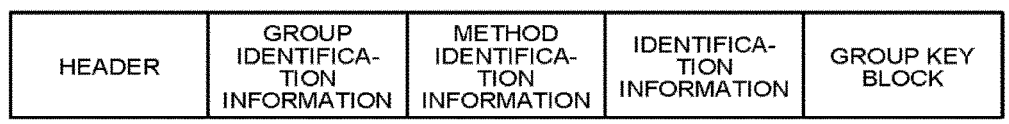
FIG. 9 is a diagram illustrating an exemplary data structure of a group operation command.

FIG. 9 is a diagram illustrating an exemplary data structure of a group operation command. A group operation command includes a header, group identification information, method identification information, identification information, and a group key block. Moreover, a group operation command can include some other information too. As described above, when the generation method can be identified from the format of the identification information, the method identification information may be omitted. The group key block represents information for deriving the group key shared among the terminals 200 that belong to the group. The group key block is used in the case in which the configuration is meant for sending the group key to the group members. Thus, when the group key is not to be sent, the group key block may be omitted.

Figure 10:
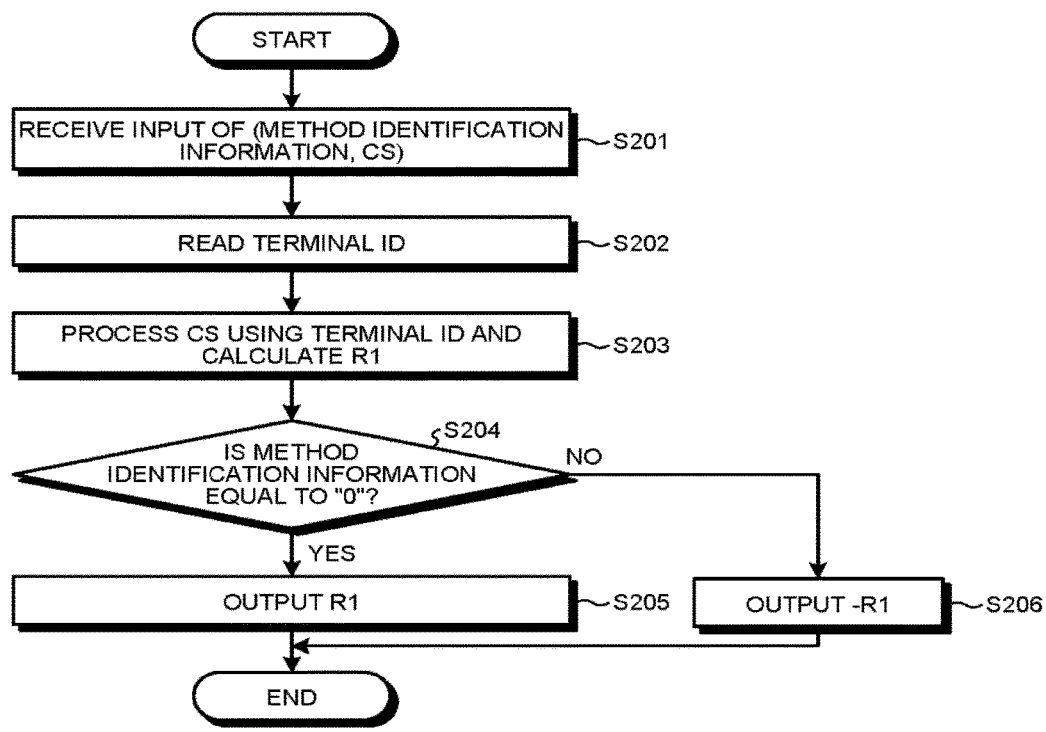
FIG. 10 is a flowchart for explaining information processing performed by the control unit.

Explained below with reference to FIG. 10 are the details of the operations performed by the control unit 210 of the terminal 200. FIG. 10 is a flowchart for explaining an example of information processing performed by the control unit 210.

The receiver unit 211 receives input of the identification information (CS) and the method identification information (Flag) (Step S201). Moreover, the receiver unit 211 reads the terminal ID from the terminal information storing unit 221 (Step S202). Then, the information processing unit 212 processes the received identification information CS using the terminal ID, and calculates output information R1 (Step S203). More particularly, the information processing unit 212 outputs the output information R1 indicating whether or not the terminal ID is included as a group member identified by the identification information CS.

The determining unit 213 determines whether or not the method identification information (Flag) is equal to "0" (Step S204). If the method identification information (Flag) is equal to "0" (Yes at Step S204), then the determining unit 213 outputs the output information R1 without modification (Step S205).

Herein, it is assumed that the method identification information (Flag) being equal to "0" represents the method identification information of the first method, and that the method identification information (Flag) being equal to "1" represents the method identification information of the second method. The first method includes compressing the group member list according to the CS method and generating identification information (first-type identification information). Hence, when the method identification information is equal to "0" (in the case of the first method), the output information R1 indicating whether or not the terminal ID is included in the identification information can be used as information indicating whether or not the concerned terminal 200 belongs as it is to the group. That is, at Step S205, the output information R1 is output without modification.

If the method identification information (Flag) is not equal to "0" (i.e., if the method identification information (Flag) is equal to "1") (No at Step S204), then the determining unit 213 outputs output information (−R1) formed by inversing the output information R1 (Step S206).

In the first embodiment, the communication control device can flexibly select a plurality of identification information generation methods according to the situation. Moreover, even in a situation in which it is not possible to predict the identification information that would be selected by communication devices; by appropriately selecting a processing method based on the method identification information, the communication control device can perform the expected operations while achieving enhancement in the flexibility. Depending on the data format of the information used in identifying the devices that belong to a group, if the number of devices belonging to the group increases, it leads to an increase in the size of the identification information and an increase in the communication load. In the first embodiment, the identification information can be reduced in size as compared to the case of using only a single identification information generation method.

(First Modification Example)

In the first embodiment, two sets of identification information (first-type identification information and second-type identification information) are generated using the CS calculating unit 112 twice. However, alternatively, first-type identification information can be generated using the CS calculating unit 112 only once, and the generated first-type identification information can then be used to generate second-type identification information. For example, the CS calculating unit 112 can refer to the terminal management information and the first-type identification information, and can calculate second-type identification information as the identification information serving as the complementary set to the first-type identification information. In that case, the complementary set calculating unit 111 may be omitted.

(Second Modification Example)

In the first embodiment, two sets of identification information (first-type identification information and second-type identification information) are generated using the CS calculating unit 112 twice. However, alternatively, the CS calculating unit 112 can generate first-type identification information and second-type identification information by performing operations only once. For example, the CS calculating unit 112 can be configured to generate first-type identification information and second-type identification information in parallel while tracing the management tree.

In this way, according to the first embodiment, as a result of implementing an appropriate generation method for generating identification information from among a plurality of generation methods, the data size of commands can be reduced as compared to the conventional methods. Moreover, in the first embodiment, since the conventional generation methods can also be implemented, there is no need to add new generation methods. Furthermore, it is possible to think of a configuration in which, if a plurality of generation methods is simply combined, a plurality of management trees is necessary. However, in the first embodiment, it is not necessary to increase the number of management trees.

(Second Embodiment)

In a communication system according to a second embodiment, the generation method is varied according to the number of members included in a group member list.

Figure 11:
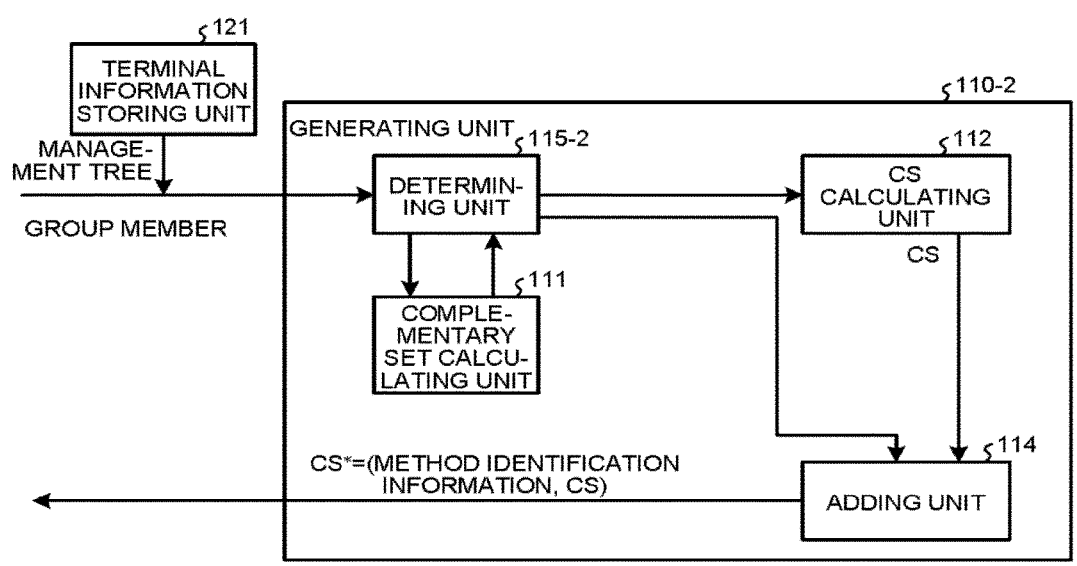
FIG. 11 is a block diagram of a generating unit according to a second embodiment.

In the second embodiment, the functions of a generating unit differ than the first embodiment. FIG. 11 is a block diagram illustrating an exemplary configuration of a generating unit 110-2 according to the second embodiment. As illustrated in FIG. 11, the generating unit 110-2 includes the complementary set calculating unit 111, the CS calculating unit 112, the adding unit 114, and a determining unit 115-2.

The second embodiment differs with the first embodiment in the way that the comparing unit 113 is omitted and a determining unit 115-2 is added. The remaining configuration and functions are identical to FIG. 4 representing the block diagram of the configuration of the generating unit 110 according to the first embodiment. Hence, the same reference numerals are used, and the explanation is not repeated.

The determining unit 115-2 compares the number of members included in the group member list that is input (i.e., the number of sets of device identification information that is specified) with a predetermined threshold value, and outputs the comparison result. For example, the threshold value can be set to be half of the total number of target terminals 200 for management. Based on the comparison result, the determining unit 115-2 inputs the processed group member list to the CS calculating unit 112, and inputs the method identification information to the adding unit 114.

For example, when the number of members included in the group member list is greater than half of the total number of terminals 200, the determining unit 115-2 selects the second method, but otherwise selects the first method. That is, when the number of members included in the group member list is greater than half of the total number of terminals 200, the determining unit 115-2 obtains the group member complementary set list using the complementary set calculating unit 111. Then, the determining unit 115-2 provides the group member complementary set list to the CS calculating unit 112, and provides the method identification information of the second method to the adding unit 114. When the number of members included in the group member list is equal to or smaller than half of the total number of terminals 200, the determining unit 115-2 provides the group member list to the CS calculating unit 112, and provides the method identification information of the first method to the adding unit 114.

Figure 12:
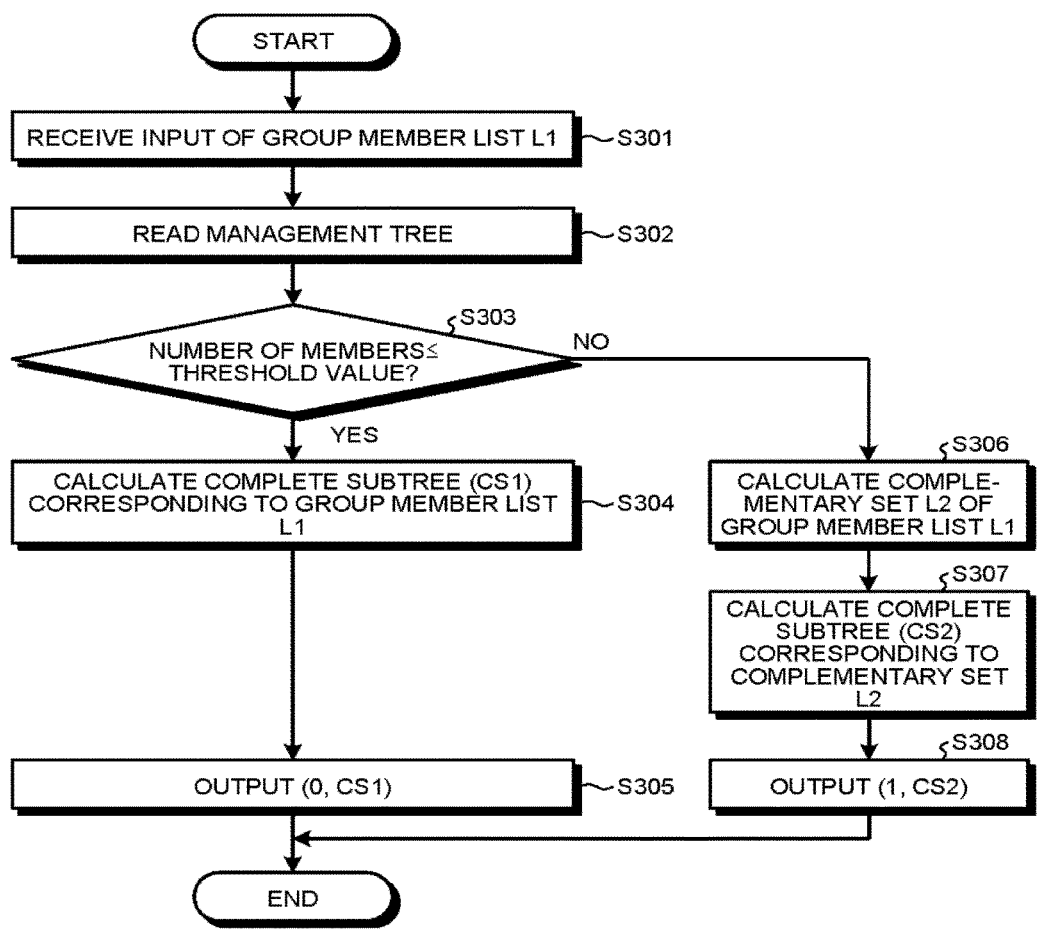
FIG. 12 is a flowchart for explaining a generation operation performed according to the second embodiment.

Explained below with reference to FIG. 12 is a generation operation performed by the group management device configured in the abovementioned manner according to the second embodiment. FIG. 12 is a flowchart for explaining an overall flow of operations performed during a generation operation according to the second embodiment.

The operations performed at Step S301 and Step S302 are identical to the operations performed at Step S101 and Step S102, respectively, by the group management device 100 according to the first embodiment. Hence, the explanation is not repeated.

The determining unit 115-2 determines whether or not the number of members included in the group member list L1 is equal to or smaller than a threshold value (Step S303). If the number of members is equal to or smaller than the threshold value (Yes at Step S303), then the CS calculating unit 112 calculates CS1 representing the CS (Complete Subtree) corresponding to the group member list L1 (Step S304). The adding unit 114 generates and outputs information (0, CS1) in which the method identification information (for example, "0") corresponding to the complete subtree CS1 is added to the complete subtree CS1 (Step S305).

If the number of members is not equal to or smaller than the threshold value (No at Step S303), then the complementary set calculating unit 111 calculates the group member complementary set list L2 that represents the list of the complementary set of the group member list L1 (Step S306). The CS calculating unit 112 calculates CS2 representing the CS (Complete Subtree) corresponding to the group member complementary set list L2 (Step S307). The adding unit 114 generates and outputs information (1, CS2) in which the method identification information (for example, "1") corresponding to the complete subtree CS2 is added to the complete subtree CS2 (Step S308).

As a result of selecting the generation method in this manner, because of the properties of the CS method, the data size can be reduced on an average. Moreover, in contrast to the first embodiment in which two sets of identification information need to be calculated, it is sufficient to generate only a single set of identification information in the second embodiment. That enables achieving reduction in the amount of processing.

(Third Modification Example)

In the first and second embodiments, identification information based on the CS method is used. However, the generation method for generating identification information is not limited to the CS method. For example, the identical function can be implemented using a method based on the SD (Subset Difference) method. For example, the configuration can be such that a generating unit is disposed for generating identification information according to the SD method, and an appropriate compression method is selected depending on the group member list. In the SD method, terminals are managed using a binary tree structure in an identical manner to the CS method, and it is possible to implement the identical function as implemented according to the CS method.

(Fourth Modification Example)

The generation method for generating identification information can include a combination of the CS method and some other method. For example, the configuration can be such that a first generating unit is disposed for generating identification information according to the CS method, a second generating unit is disposed for generating identification information according to the SD method, and an appropriate compression method is selected depending on the group member list. Since the CS method as well as the SD method enables management of devices using a binary tree structure, the command size can be reduced without causing an increase in the terminal management information.

(Fifth Modification Example)

If the tendency of the target members for group operations in a system is known in advance, the communication control device can select in advance one of a plurality of generation methods for generating identification information. The communication control device according to a fifth modification example is not equipped with a plurality of generation methods for generating identification information, but is equipped with only a single generation method for generating identification information. As is the case in the fifth modification example, even if a system includes a communication control device having a fixed generation method for generating identification information regardless of the configuration of the target group members for operations, the communication device performs identical operations to the operations performed according to the second embodiment. That is, since the communication device decides on the operations according to the information received by the receiver unit, the communication device performs operations as expected as long as the format of the received information is correct. The fifth modification example has the advantage of enabling simplification of the configuration of the communication control device.

(Third Embodiment)

In a communication system according to a third embodiment, in an identical manner to the first embodiment, a plurality of generation methods for generating identification information is implemented using a single particular tree structure. More particularly, depending on the group member list, selection is done between the method in which identification information enabling identification of the members belonging to the group is generated according to the CS method and the method in which identification information enabling identification of the members not belonging to the group is generated according to the SD method. As a result, it becomes possible to reduce the data size to a greater extent than the method in which the identification information is generated using only the CS method or using only the SD method. Moreover, in the first and second embodiments, although group members can be specified, the group key cannot be distributed. In the third embodiment, it also becomes possible to distribute the group key.

In the communication system according to the third embodiment, each terminal 200 is managed in a corresponding manner to a leaf of a binary tree in an identical manner to the first embodiment. In the third embodiment, it is assumed that, in accordance with the binary tree, device keys (first-type device keys) based on the CS method and device keys (second-type device keys) based on the SD method are generated. Thus, it is assumed that the group management device holds the binary tree used in management, holds the correspondence relationship between the leaves and the terminals 200, holds all device keys based on the CS method, and holds all device keys based on the SD method.

In each terminal 200 according to the third embodiment, in an identical manner to the embodiments described above, the leaf identification information indicating the corresponding leaf in the tree structure (i.e., the node index of the corresponding leaf node) is stored in advance. Thus, it is assumed that, based on the leaf identification information, each terminal can derive the node index of each node in the path starting from the root of the tree structure to the leaf identified by the leaf identification information. Moreover, it is assumed that each terminal 200 holds the CS-method-based device key and the SD-method-based device key of itself.

Figure 13:
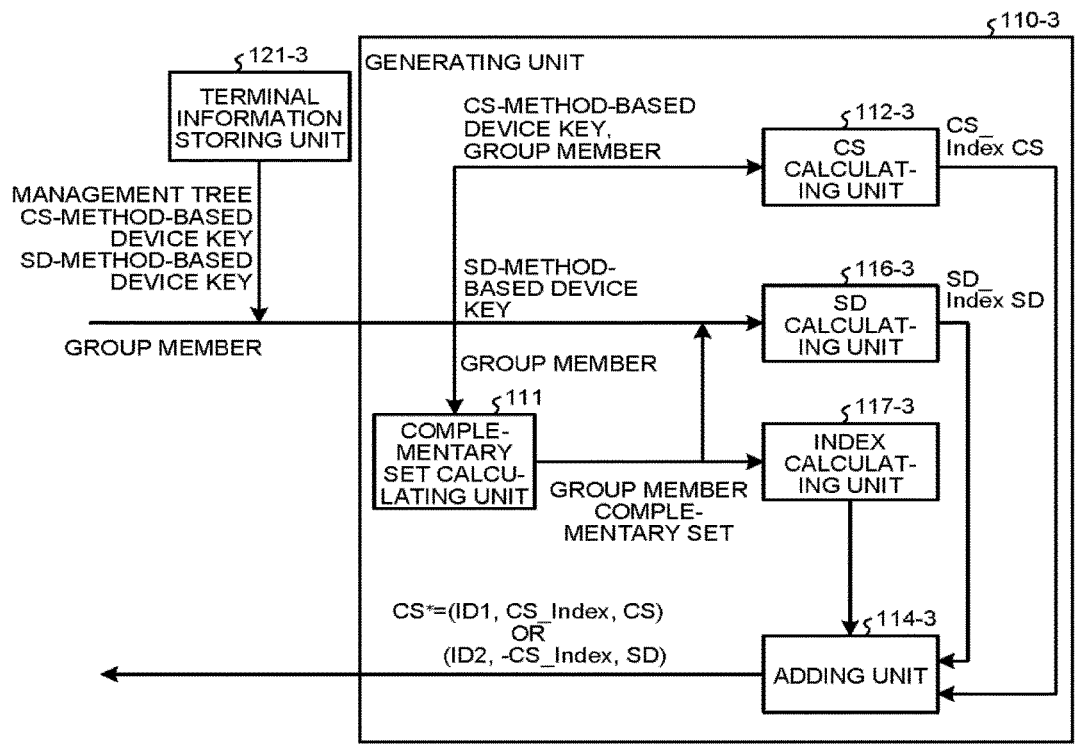
FIG. 13 is a block diagram of a generating unit according to a third embodiment.

In the third embodiment, the function of a generating unit is different than in the first embodiment. FIG. 13 is a block diagram illustrating an exemplary configuration of a generating unit 110-3 according to the third embodiment. As illustrated in FIG. 13, the generating unit 110-3 includes the complementary set calculating unit 111, a CS calculating unit 112-3, an SD calculating unit 116-3, an index calculating unit 117-3, and an adding unit 114-3. Meanwhile, as described above, in the third embodiment, the group management device stores the device keys based on the CS method (CS-method-based device keys) and the device keys based on the SD method (SD-method-based device keys) in a terminal information storing unit 121-3.

The complementary set calculating unit 111 has an identical configuration and function to that illustrated in FIG. 4 representing the block diagram of the configuration of the generating unit 110 according to the first embodiment. Hence, the same reference numerals are used, and the explanation is not repeated.

The CS calculating unit 112-3 calculates identification information (CS) according to the CS method from the group member list and the terminal management information, and generates an encryption data index (CS_Index) that specifies the device key to be used in decoding.

The SD calculating unit 116-3 calculates identification information (SD) according to the SD method from the group member list and the terminal management information, and generates an encryption data index (SD_Index) that specifies the device key to be used in decoding.

The index calculating unit 117-3 generates, from the group member complementary set list and the terminal management information, an encryption data index (−CS_Index) that specifies the device key to be used in decoding.

The adding unit 114-3 selects either the identification information CS or the identification information SD, and generates information (CS*) in which the method identification information (in FIG. 12, ID1 or ID2) of the generation method corresponding to the selected identification information is added to the selected identification information. For example, the method identification information "ID1" represents the CS-method-based generation method (the first method), and the method identification information "ID2" represents the SD-method-based generation method (the second method).

The method by which the adding unit 114-3 selects either the identification information CS or the identification information SD can be any arbitrary method. For example, in an identical manner to the embodiments described above, the selection can be done according to the data size or the number of members.

In the third embodiment, the encryption data index (CS_Index or −CS_Index) is included in the information CS*. As a result, if the terminal 200 that receives a group operation command including the information CS* is holding the device key specified by the encoded data index, then the group key can be derived using the device key.

For example, the receiver unit of the terminal 200 receives an encrypted index as key information from which the group key can be derived. Then, if "ID1" represents the method identification information (the first method), then the information processing unit of the terminal 200 calculates the group key according to the CS method from the encrypted index. On the other hand, if "ID2" represents the method identification information (the second method), the information processing unit of the terminal 200 calculates the group key according to the SD method from the encrypted index.

In this way, in the group management device according to the third embodiment, the distribution of the group key to the group members is either performed using the CS-method-based encryption data in response to the selection of the first method or performed using the SD-method-based encryption data in response to the selection of the second method.

As described above, in the communication control device according to the third embodiment, as a result of using the SD method and the CS method in combination, the data size of commands can be reduced to a greater extent than in the case of distributing the group key using only the SD method or in the case of distributing the group key using only the CS method.

As described above, according to the first to third embodiments, the data representing the group members can be reduced in size, and group management can be performed in an efficient manner.

Meanwhile, in the embodiments, a flag is used as the method identification information. However, that is only an exemplary case. That is, as long as the method is identifiable, any type of data can be used. For example, a fixed-length bit string such as an octet can be used, or a variable-length bit string can be used.

Figure 14:
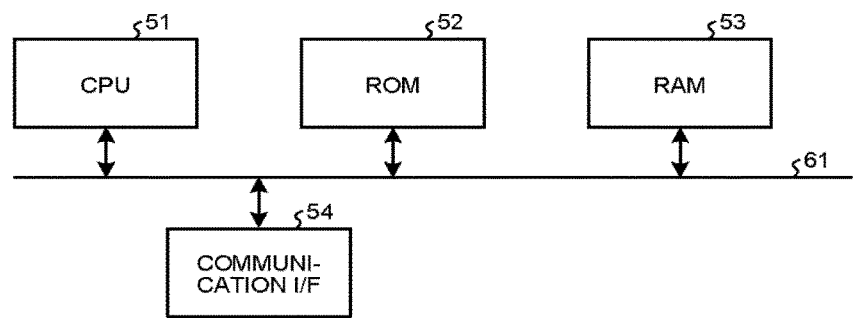
FIG. 14 is a hardware configuration diagram of the devices according to the first to third embodiments.

Explained below with reference to FIG. 14 is a hardware configuration of the devices (the group management device and the terminals) according to the first to third embodiments. FIG. 14 is an explanatory diagram illustrating a hardware configuration of the devices according to the first to third embodiments.

The devices according to the first to third embodiments include a control device such as a CPU (Central Processing Unit) 51, memory devices such as a ROM (Read Only Memory) 52 and a RAM (Random Access Memory) 53, a communication I/F 54 that establishes connection with a network and performs communication, and a bus 61 that connects the other constituent elements.

The programs executed in the devices according to the first to third embodiments are stored in advance in the ROM 52.

Alternatively, the programs executed in the devices according to the first to third embodiments can be recorded as installable or executable files in a computer-readable recording medium such as a CD-ROM (Compact Disk Read Only Memory), a flexible disk (FD), a CD-R (Compact Disk Recordable), or a DVD (Digital Versatile Disk).

Still alternatively, the programs executed in the devices according to the first to third embodiments can be stored in a downloadable manner in a computer that is connected to a network such as the Internet. Still alternatively, the programs executed in the devices according to the first to third embodiments can be distributed via a network such as the Internet.

The programs executed in the devices according to the first to third embodiments can make a computer function as the constituent elements of the communication control device described above. In the computer, the CPU 51 can read the programs from a computer-readable memory medium into a main memory device, and execute them.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A communication control device comprising:
one or more processors configured to:
refer to specification information, which specifies a communication device belonging to a group from among a plurality of communication devices;
generate identification information by implementing a first method using a management tree, the identification information enabling identification of the communication device specified in the specification information; and
send the identification information to a plurality of the communication devices, and
storage that stores the management tree for managing device identification information, which enables identification of a plurality of the communication devices, using a binary tree structure, wherein
a size of the identification information that is generated by the first method is smaller than a size of the identification information that is generated by a second method using the management tree,
the specification information specifies the device identification information of the communication device belonging to the group,
the first method generates first-type identification information in which the device identification information specified from among the device identification information managed in the management tree is expressed according to a Complete Subtree (CS) method, and
the second method generates second-type identification information in which the device identification information not specified from among the device identification information managed in the management tree is expressed according to the CS method.

2. The communication control device according to claim 1, wherein
the storage stores
a first-type device key that is generated according to CS method based on the binary tree structure, and
the one or more processors
generate, when the identification information is generated according to the first method, a group key according to CS method using the device identification information that is specified and the first-type device key, and
send the generated group key to a plurality of the communication device.

3. The communication control device according to claim 1, wherein the one or more processors
generate a plurality of sets of the identification information using each of the first method and the second method and, from among the plurality of sets of the identification information that is generated, and
output the identification information having a smaller size than other sets of the identification information.

4. The communication control device according to claim 1, wherein the one or more processors
compare the number of sets of the specified device identification information with a threshold value, and
generate the identification information according to the first method that is selected based on a comparison result.

5. The communication control device according to claim 1, wherein the one or more processors
output method identification information, which enables identification of a generation method used in generating the identification information, along with the generated identification information; and
send the method identification information, along with the generated identification information.

6. A communication device that is connected to a communication control device, the communication device comprising:
one or more processors configured to:
receive identification information which enables identification of one or more of a plurality of target devices including one or more external devices and the communication device;
output information indicating whether or not the communication device is included in the target devices identified by the identification information;
based on the output information, determine whether or not the communication device belongs to a group; and
receive method identification information that enables identification of a generation method implemented to generate the identification information, wherein
the method identification information represents information indicating either one of
a first method in which the device identification information that is specified from among the device identification information included in the binary tree structure is compressed according to a Complete Subtree (CS) method; and
a second method in which the device identification information that is not specified from among the device identification information included in the binary tree structure is compressed according to the CS method, and
when
the method identification information indicates the first method and the output information indicates that the communication device is included in the target devices identified by the identification information, or
the method identification information indicates the second method and the output information indicates that the communication device is not included in the target devices identified by the identification information,
the one or more processors determine that the communication device belongs to the group.

7. The communication device according to claim 6, wherein the one or more processors update group information stored in storage based on a determination result indicating whether or not the communication device belongs to the group.

8. The communication device according to claim 6, wherein the one or more processors
receive key information from which a group key is derivable, and
calculate a group key from the key information according to the CS method when the identification information is processed according to the first method.

9. A computer program product comprising a computer-readable medium containing a program executed by a computer, the program causing the computer to execute:
referring to specification information, which specifies a communication device belonging to a group from among a plurality of communication devices, and
generating identification information by implementing a first method using a management tree, the identification information enabling identification of the communication device specified in the specification information; and
sending the identification information to a plurality of the communication devices; wherein device identification information, which enables identification of the plurality of the communication devices, is managed by the management tree having a binary tree structure,
a size of the identification information that is generated by the first method is smaller than a size of the identification information that is generated by a second method using the management tree,
the specification information specifies the device identification information of the communication device belonging to the group,
the first method generates first-type identification information in which the device identification information specified from among the device identification information managed in the management tree is expressed according to a Complete Subtree (CS) method, and
the second method generates second-type identification information in which the device identification information not specified from among the device identification information managed in the management tree is expressed according to the CS method.

10. A computer program product comprising a computer-readable medium containing a program executed by a computer that is connectable to a communication control device, the program causing the computer to execute:
receiving identification information which enables identification of one or more of a plurality of target devices including one or more external devices and the communication device;
outputting output information indicating whether or not the communication device is included in the target devices identified by the identification information;
determining, based on the output information, whether or not the communication device belongs to a group; and
receiving method identification information that enables identification of a generation method implemented to generate the identification information, wherein
the method identification information represents information indicating either one of
a first method in which the device identification information that is specified from among the device identification information included in the binary tree structure is compressed according to a Complete Subtree (CS) method; and
a second method in which the device identification information that is not specified from among the device identification information included in the binary tree structure is compressed according to the CS method, and
it is determined that the communication device belongs to the group:
when the method identification information indicates the first method and the output information indicates that the communication device is included in the target devices identified by the identification information, or
when the method identification information indicates the second method and the output information indicates that the communication device is not included in the target devices identified by the identification information.

11. A communication device that is connected to a communication control device which issues a command, wherein
the command includes
group identifier enabling identification of a group,
identification information representing information in which one or more sets of device identification information from among device identification information, which enables identification of a plurality of the communication devices, managed in a management tree are expressed according to a Complete Subtree (CS) method, and
method identification information that enables identification of a generation method implemented to generate the identification information, the method identification information representing information indicating either one of
a first method in which the device identification information that is specified from among the device identification information included in the management tree is compressed according to the CS method; and
a second method in which the device identification information that is not specified from among the device identification information included in the management tree is compressed according to the CS method,
and
the communication device comprises one or more processors configured to:
receive the command;
from the identification information and specific information, and output output information indicating whether or not the communication device is included in target devices identified by the identification information among one or more of a plurality of target devices including one or more external devices and the communication device;
determine that the communication device belongs to a group when the flag indicates the first method and the output information indicates that the communication device is included in the target devices;
determine that the communication device does not belong to the group when the method identification information indicates the first method and the output information indicates that the communication device is not included in the target devices;
determine that the communication device does not belong to the group when the method identification information indicates the second method and the output information indicates that the communication device is included in the target devices; and
determine that the communication device belongs to the group when the method identification information indicates the second method and the output information indicates that the communication device is not included in the target devices,
the management tree is a complete binary tree used in the CS method,
each leaf node of the complete binary tree is associated to one of the plurality of target devices,
each of the method identification information identifies one of the plurality of target devices associated to one of the leaf node of the management tree, and
the specific information represents a node index of leaf nodes associated to the communication devices.

* * * * *